Feb. 17, 1931. R. W. SNYDER 1,792,776
METHOD OF BUILDING TIRES
Filed Feb. 8, 1929
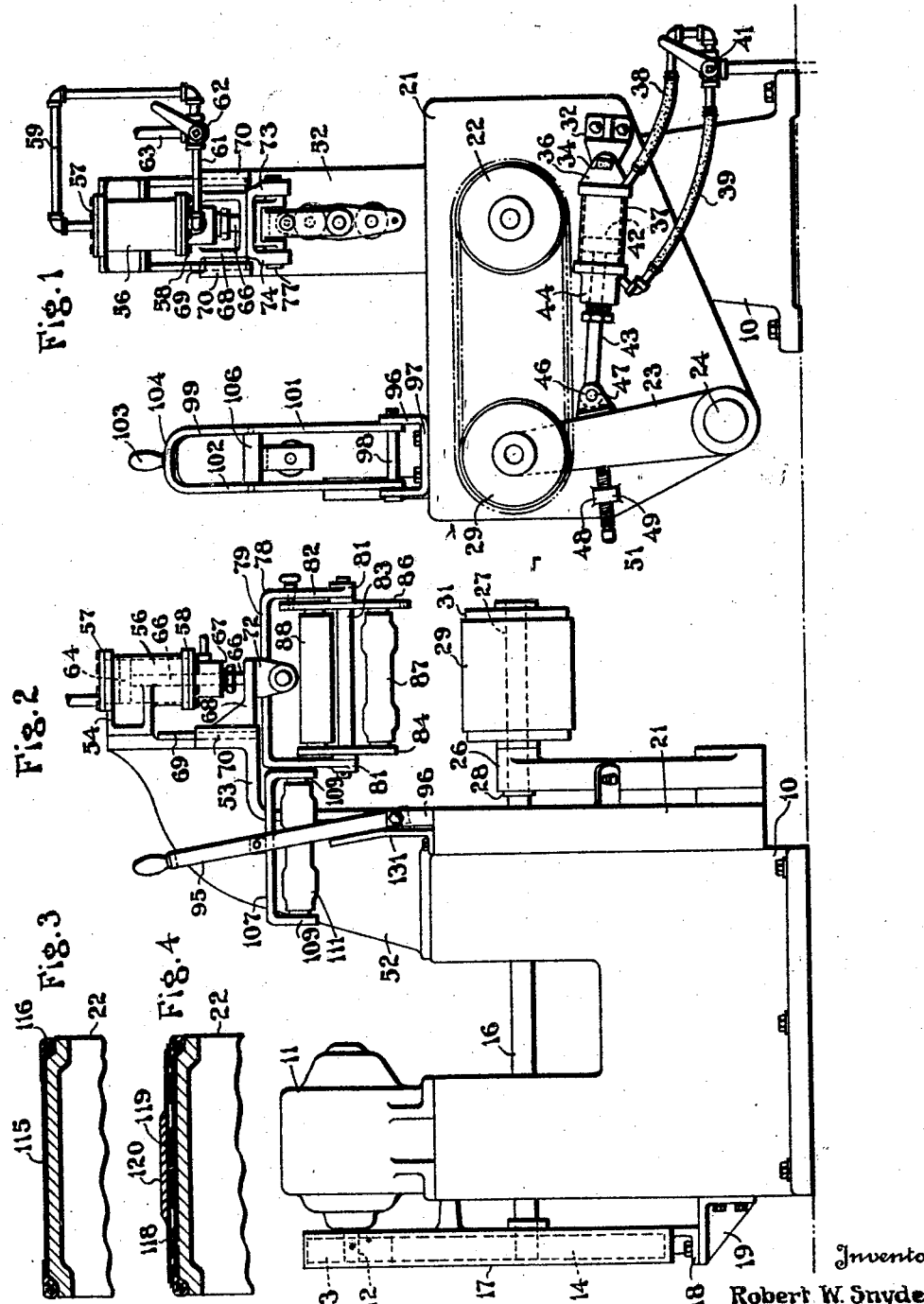
Inventor
Robert W. Snyder
By
Attorney Patented Feb. 17, 1931

1,792,776

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

METHOD OF BUILDING TIRES

Application filed February 8, 1929. Serial No. 338,409.

This invention relates to the fabrication of pneumatic tires for vehicles and it has particular relation to a machine for, and a method of assembling so-called flat-built bands of which such tires are constructed.

One object of the invention is to provide a tire fabricating machine in which the conventional collapsible drum is dispensed with.

Another object of the invention is to provide a method of manufacturing pneumatic tires in which it is unnecessary to cement the inner plies of fabric to the surface of a drum.

Heretofore, it has been proposed to manufacture pneumatic tire casings by assembling the various elements of which such tires are composed upon a cylindrical, collapsible drum. According to this method, after the assembly has been completed, the drums were collapsed, and the bands removed and placed upon a shaping machine. This machine expanded the central or tread portion of the tires, thus causing the bead portions to approach each other until the tire assumed the toroidal contour of the conventional pneumatic tire. Processes of this character are objectionable because it is necessary to employ a drum of substantially the same diameter as the inner diameter of the tire beads. Therefore, a drum could be employed only for the manufacture of one size of tire. Since the drums were formed of collapsible segments and were relatively complicated, much expense was entailed in providing the large number of drums required in building tires of different sizes. Also, in a process of this character, it was necessary to cement the inner plies of fabric to the surface of the drum in order to secure them firmly thereto during the process of manufacturing the tire of which they were a part. Very often it was difficult to release the inner plies of fabric from the drum, so that the tire band could be removed after it was finished.

This invention consists in the provision of a tire building machine having a plurality of parallel rotatable drums of relatively small diameter, about which the plies of fabric of a tire band may be trained. One or more of these drums may be made movable with respect to the other, so that the machine may be adapted for the construction of tires of different bead diameters, merely by varying the spacing of the drums. Hence, a machine constructed in accordance with the provisions of the invention may be employed without change, other than in the spacing of the drums, in manufacturing tires of any bead diameter. Since the tire bands travel about the drums in the same manner as an endless belt, the cementing of the bands to the drum is unnecessary. Consequently, the bands easily may be removed when the movable drum is swung toward the fixed one.

For a better understanding of the invention, reference may now be had to the accompanying drawings, forming a part of the specification, of which;

Figure 1 is a side-elevational view of a machine embodying the invention;

Figure 2 is an end-elevational view of the embodiment of the invention illustrated by Figure 1;

Figure 3 is a fragmentary cross-sectional view of one of the drums employed in the machine and illustrating a tire band at one stage during the process of its manufacture; and Figure 4 is a fragmentary cross-sectional view of the drum shown by Figure 3 and illustrating a tire band at another stage in its manufacture.

In practicing the invention, a machine housing 10 is employed for supporting a driving motor 11 secured upon an upper portion thereof, which motor is provided with a drive shaft 12 projecting rearwardly over the edge of the base, as best shown in Figure 2 of the drawing. A gear 13, rigidly keyed upon the end of the shaft 12, engages a driving gear 14, secured upon the projecting end of a drive shaft 16. In order to protect the gears 13 and 14 from dust or other interfering matter, and in order to prevent injury to the operator of the machine, the gears are enclosed in a casing 17, which is bolted, as indicated at 18, to a bracket 19 secured to the side of the housing 10.

The shaft 16 projects forwardly through a relatively large front plate 21 secured to the housing 10, and is provided at its extremity with a cylindrical tire band supporting pulley or drum 22 of relatively small diameter. An arm 23, pivoted to a stud shaft 24 mounted adjacent the lower edge of the plate 21, has at its upper extremity a bearing portion 26, within which a stud shaft 27 is journalled. The rear end of the latter member has a collar 28 secured thereto, which prevents forward movement of the shaft within the bearing 26, while the forward end of said shaft is keyed within the hub of a pulley or drum 29, that is substantially similar to the drum 22. It will be noted that the edges of the drums 22 and 29 are provided with peripheral depressions 31, constituting seats for the beads of tires which are constructed thereon.

A pneumatic mechanism for varying the spacing of the drums 29 and 22 comprises a bracket 32, bolted to the forward face of the plate 21 adjacent the lower edge thereof, carrying a stud shaft or pintle 34, upon which a bearing portion of a bracket 36 formed upon the rear end or head of a compression cylinder 37, is journalled. Flexible conduits 38 and 39 connect the opposite ends of the cylinder 37 to a multi-passage valve 41 that controls the admission of fluid under pressure to the cylinder 37. A piston slidably mounted within the cylinder 37 is rigidly secured to one end of a piston rod 43, having a pin 47 at its opposite end which is journalled within a pair of aligned openings formed in a spaced pair of lugs 46 projecting normally from an intermediate portion of the arm 23. A stuffing box 44, disposed at one end of the cylinder 37, normally prevents the escape of fluid around the piston rod 43.

A bracket 49, projecting normally from the plate 31, is provided with a threaded opening for receiving a set screw 51 having its forward extremity projecting into the path of the arm 23, thereby permitting regulation of the distance between the drums for tire bands of various sizes.

An upper portion of the housing 10 opposite the motor 11 is provided with an upwardly extending bracket 52, having a substantially horizontal portion 53 overhanging the drum 27, the forward face of which forms a support for a bracket 54 cast integrally with a vertically disposed operating cylinder 56. The ends of the cylinder are closed by cylinder heads 57 and 58, through which extend conduits 59 and 61, that lead to a multi-passage valve 62 for controlling the admission to the cylinder of fluid under pressure from a main 63. A piston 64, disposed within the interior of the cylinder 56, is rigidly secured to a piston rod 66, which projects downwardly through a stuffing box 67 engaging the cylinder head 57.

The lower end of the piston rod 66 is rigidly secured to a vertically slidable bracket 68 which has a slide portion 69 operating between guides 70 upon the forward face of the member 53. A movable support thus is formed for a member 72 of U-shape, having downwardly extending bearing portions 73 and 74, between which a cross member 77 is journalled. A second and larger member 78 of U-shape is so secured by the bight portion 79 thereof to the member 77 as to be suspended downwardly therefrom.

Bearings 81, formed at the extremities of the branches 82 of the member 78, rotatably support the opposite ends of a shaft 83, upon which the intermediate portions of a pair of spaced and transversely disposed cross arms 84 and 86 are journalled. The members 84 and 86 are provided adjacent their opposite ends with bearings for a pair of stitcher rollers 87 and 88, which are journalled therein. The surface of the roller 87 is so shaped as to be complementary, approximately, to the contour of a tire band after the tread element has been applied thereto, and consequently is employed for stitching the tread band to the previously assembled portions of the tire carcass. The roller 88, which is employed in stitching together the plies and other elements of a tire band exclusive of the tread, preferably is formed with a coating of rubber or other resilient material, in order to provide a surface capable of accommodating small irregularities in the surfaces of the tire building elements.

Since the tread element of a tire is composed of uncured rubber, the application of undue pressure to its surface before the element has been secured to the tire carcass might result in stretching and wrinkling of the element. It is, therefore, advisable to stitch the element lightly to the outer ply of fabric before applying the finishing stitcher roller 87. The mechanism indicated at 95 may be employed for this preliminary stitching operation. The latter comprises a member 96 of U-shape, the bight portion 97 of which is bolted to the upper edge of the plate 21 at a point immediately opposite the drum 29. A shaft 98 is secured transversely of the member 96 and functions as a bearing for a pivotally mounted U-shape stitcher arm 99. The latter has relatively long branches 101 and 102, and a handle 103 attached to the intermediate portion 104 thereof for oscillating the arm upon the shaft 98.

A shaft 106, journalled intermediate the ends of the member 99, supports a U-shape stitcher roller supporting member 107 having bearings formed in the branches 109 thereof, within which a stitcher roller 111 is journalled. It will be observed that the roller is of substantially the same contour as the roller 87, and hence adapts itself readily to the contour of the tread element.

In order to maintain the stitcher mechanism 95 in a position where it will not obstruct the movements of the operator when it is idle, a bracket 131 is secured to the plate 21, directly behind the one branch 101 of the arm 99. When the device is not in operation the arm may recline against the forward face of the bracket 131 in which position it is readily accessible to the operator.

In the construction of a tire upon the device disclosed, an endless band 115 is trained about the pulleys 22 and 29, during which operation the piston 42 is retracted in order to cause the drum 29 to approach the drum 22, thereby facilitating the application of the band. When the band has been properly positioned, the beads 116 of the tire are disposed within the grooves or shoulder portions 31 upon the edges of the aforesaid band. Fluid under compression is then admitted to the cylinder 37, thereby actuating the arm 23 and swinging the drum 29 away from the drum 22, thus applying tension to the bands and the beads which are now trained about the drums. The edges of the plies are next turned up about the beads of the tires by means of a suitable hand tool.

Additional plies of fabric, together with chafing strips 118 and the breaker strips 119, are then applied one at a time, to the upper surface of the band 115, and the roller 88 is operated to stitch these additional elements to the first-mentioned ply. When this operation is completed, the valve 62 is operated to admit compressed fluid to the lower end of the stitcher actuating cylinder 56, thus causing the stitcher roller 88 to be elevated. The shaft 83 is then rotated, thus causing the tread stitching roller 87 to be brought into operative position.

In order to apply a tread element 120 which is preferably supplied in the form of an open band, one end of the element is positioned upon the tire carcass at a point directly above the center line of the drum 29. The handle 103 is grasped by the operator and the arm 99 is swung downwardly until the stitcher roller 111 contacts with the surface of the tread element. The motor 11 is next operated to cause the driven drum 22 to rotate slowly for purpose of drawing the tread element between the roller 111 and the carcass of the tire, thereby stitching the tread element lightly to the surface of said carcass.

After the tread element has been thus partially stitched in position so that it cannot readily be distorted by the application of such force as is necessary to cause complete stitching of the surface of the tread element to the carcass, the valve 62 is actuated thus urging the roller 87 into contact with the outer surface of the tread element and finally stitching the latter to the tire carcass.

When it is desired to remove the assembled tire band from the machine, compressed fluid is admitted to the cylinder 37 for actuating the piston 42 and thus retracting the arm 43. This movement causes the drum 29 to approach the drum 22, and thereby releases the tension upon the band so that it may be slipped easily from the drums. The band may then be shaped and vulcanized by any convenient method.

From the preceding description it will be evident that I have provided an extremely simple method and machine for fabricating pneumatic tires. One great advantage of the invention consists in the fact that it may be employed for the manufacture of tires of any convenient internal diameter without the substitution of expensive parts. Furthermore, since the inner plies of tire fabric are not cemented to the surface of the drum, no time is lost by the operator in performing that operation. Furthermore, since the fabric is in no wise cemented to the drums, it may be removed easily therefrom upon the release of the tension placed upon the band by the two drums.

Although I have illustrated only one form which the invention may assume and described in detail only a single application thereof, it will be apparent to those skilled in the art that it is not so limited, but that various minor modifications may be made therein without departing from the spirit of the invention or from the scope of the appended claims.

What I claim is:

1. A machine for fabricating pneumatic tire bands comprising a base, a plurality of rotatable tire bands supporting drums mounted on the base in parallel relation, a stitcher roller mounted adjacent one of the drums, pneumatic means for actuating the stitcher roller toward and away from the drum in order to bring the surface of the stitcher roller into contact with the tire carcass upon the drum, an auxiliary stitcher device mounted adjacent another of the drums and pneumatically operated means for moving one of the drums toward or away from the other in order to permit the application or release of tension upon the tire band positioned upon the drums.

2. A machine for manufacturing pneumatic tire bands comprising a rotatable drum for receiving a tire band, a stitcher roller disposed adjacent the drum, the roller being of such length and contour as to contact with the tread elements of tire bands substantially throughout their widths, means for supporting and moving the stitcher roller toward and away from the drum, and means pivotally connecting the roller to the supporting means at a point approximately midway between the ends of the roller whereby to equalize the pressure exerted by the various portions of the roller upon the tread.

3. A machine for manufacturing pneumatic tire bands comprising a rotatable drum, a roller support rotatable about an axis parallel to the drum, rollers rotatably